US005396982A

United States Patent [19]

Wicha

[11] Patent Number: 5,396,982

[45] Date of Patent: Mar. 14, 1995

[54] PROFILED GUIDE RAIL

[75] Inventor: Lothar J. Wicha, Karlstadt, Germany

[73] Assignee: Koenig & Bauer Aktiengesellschaft, Wurzburg, Germany

[21] Appl. No.: 202,088

[22] Filed: Feb. 25, 1994

[30] Foreign Application Priority Data

Feb. 26, 1993 [DE] Germany ........................ 43 05 955.4

[51] Int. Cl.[6] ............................................ B65G 45/00

[52] U.S. Cl. ..................................... 198/494; 198/838

[58] Field of Search ......................... 198/838, 845, 494

[56] References Cited

U.S. PATENT DOCUMENTS

| | | | |
|---|---|---|---|
| 1,851,380 | 3/1932 | Briggs | 198/838 |
| 2,710,683 | 6/1955 | McClenny, Jr. | 198/841 X |
| 4,062,444 | 12/1977 | Nakov et al. | 198/779 X |
| 4,074,801 | 2/1978 | Monk et al. | 198/494 X |
| 4,944,384 | 7/1990 | Herron | 198/841 X |
| 5,069,327 | 12/1991 | Stöhr et al. | 198/725 |
| 5,201,269 | 4/1993 | Eckert | 101/228 |

FOREIGN PATENT DOCUMENTS

| | | |
|---|---|---|
| 0 395 864 | 3/1990 | European Pat. Off. . |
| 41 10 668 | 5/1992 | Germany . |
| 706297 | 1/1980 | U.S.S.R. . |

OTHER PUBLICATIONS

"Saubere Materialoberflachen", Issue 9, p. 58, Dated Dec. 31, 1975 from Publication Papier+Kunststoff-Verarbeiter.

*Primary Examiner*—Cheryl L. Gastineau

*Attorney, Agent, or Firm*—Jones, Tullar & Cooper

[57] ABSTRACT

A profiled guide rail, for use in providing a guide path for a roller chain in a web-fed rotary printing press, utilizes a plurality of slits as paths through which ink particles and paper dust can pass out of the track in the guide rail along which the roller chain travels. These slits pass through at least one leg of the guide rail and are longitudinally spaced in the direction of travel of the roller chain.

13 Claims, 2 Drawing Sheets

PROFILED GUIDE RAIL

FIELD OF THE INVENTION

The present invention is directed generally to a profiled guide rail. More particularly, the present invention is directed to a profiled guide rail for guiding a roller chain. Most specifically, the present invention is directed to a profiled guide rail for guiding a roller chain during feeding of a paper web in a web-fed rotary printing press. The profiled guide rail has a generally C-shaped cross section and may be either straight or curved. One or both of the legs of the guide rail have openings or slits which pass through the associated leg of the rail. These openings allow dust and debris to pass through and not accumulate in the chain guide groove portion of the profiled guide rail. They also allow the guide rail to be shaped into various curves as required when placing the guide rail about rollers and cylinders in the web-fed rotary press.

DESCRIPTION OF THE PRIOR ART

In web-fed rotary printing presses, it is frequently necessary to feed the leading edge of a web of paper through the printing press from a source of web supply, such as a reel stand or the like, through the various printing press sections and to the formers and folders. If the web breaks during the printing operation, it is necessary to feed the web through the press from its point of breakage. It is also frequently the situation where the path of paper web travel through the rotary web-fed printing press may have to be changed in accordance with changes in the type of printing being accomplished.

It is generally-well known to use roller chains with web grippers to pull the leading edge of a paper web through a printing press. The roller chains are typically guided along guide rails or channels that are secured to the side frames of the printing press. One such prior art rail for guiding a roller chain in a web-fed rotary printing press is shown in German patent publication No. DE 41 10 688 C1. In this prior art publication there is shown a roller chain guide that has a generally C-shaped cross-sectional profile and which is made of a plastic material. Such a prior art C-shaped profile can have a sheet metal sheathing or cover on its exterior surface for mechanical protection as well as for use in facilitating the securement of the guide rail to the side frame of the printing press. Such a C-shaped profiled guide rail can extend in a straight path or can follow a curved path, depending on the production requirements of the particular printing press.

In the use of prior art profiled guide rails, one problem which typically occurs is the collection of paper dust and ink particles in the guide channel of the profiled guide rail. This accumulated debris results in sluggishness of the paper web guiding roller chain as it is being pulled through the profiled guide rail. This accumulation of rubbed off ink and paper dust is particularly troublesome in the curved sections of the profiled guide rail which are used for guiding the paper web around cylinders or paper guide rollers in the web-fed rotary printing press. Such sluggishness or resistance in the travel path of the roller chain can lead to ripping of the paper web being fed through the press. It can also require the provisions of additional drive stations for the roller chain.

It will thus be seen that a need exists for a profiled rail for guiding a roller chain which overcomes the limitations of the prior art. The profiled guide rail in accordance with the present invention provides such a device and is a significant improvement over the prior art.

SUMMARY OF THE INVENTION

It is an object of the present invention to provide a profiled guide rail.

Another object of the present invention is to provide a profiled guide rail for guiding a roller chain.

A further object of the present invention is to provide a profiled guide rail for guiding a roller chain in a web-fed rotary printing press.

Yet another object of the present invention is to provide a profiled guide rail that can be either straight or curved.

Still a further object of the present invention is to provide a profiled guide rail having a generally C-shaped cross-sectional profile.

Even yet another object of the present invention is to provide a profiled guide rail which prevents the accumulation of a mixture of ink and paper dust in the track of the profiled guide rail.

As will be discussed in detail in the description of the preferred embodiments which is set forth subsequently, the profiled guide rail in accordance with the present invention has a generally C-shaped cross-sectional profile which is defined by a base body and two spaced, generally parallel legs that extend away from the base body. Each of the legs has a track which forms a guide path for the roller chain that is being guided by the profiled guide rail. The tracks are defined by elongated grooves formed in the inwardly facing surfaces of the two legs. Each of the legs may be provided with a plurality of spaced slits or openings that are situated in the grooves and which pass through the legs of the profiled guide rail. These slits allow the rubbed off ink particles and the paper dust being deposited in the guide tracks of the profiled guide rail to be pushed outwardly through the legs of the guide rail by the action of the roller chain. This insures that the ink and paper dust will not accumulate in the profiled guide rail and will instead be pushed out of the guide rail. Easy movement of the roller chain through the profiled guide rail is thus assured by the structure of the profiled guide rail in accordance with the present invention.

The profiled guide rail may be formed in straight sections. It may also be curved as required by the necessary paper web feed path which will pass around various cylinders and paper web guide rollers. To shape the profiled guide rail into a desired curved path, the guide rail can be provided with slots or slits which extend not only through the groove which forms the roller chain guide track in one leg but also through the entire leg and through a portion of the base body of the guide rail. This use of larger slits makes the guide rail more flexible so that it can be formed into desired curved shapes.

The profiled guide rail in accordance with the present invention overcomes the limitations of the prior art devices. It provides a guide rail for use in the guiding of a roller chain in a web fed rotary printing press which is a substantial advance in the art.

BRIEF DESCRIPTION OF THE DRAWINGS

While the novel features of the profiled guide rail in accordance with the present invention are set forth with particularity in the appended claims, a full and complete understanding of the invention may be had by referring to the detailed description of the preferred embodiments which is presented subsequently, and as illustrated in the accompanying drawings, in which:

DESCRIPTION OF THE PREFERRED EMBODIMENTS

Figure 1:
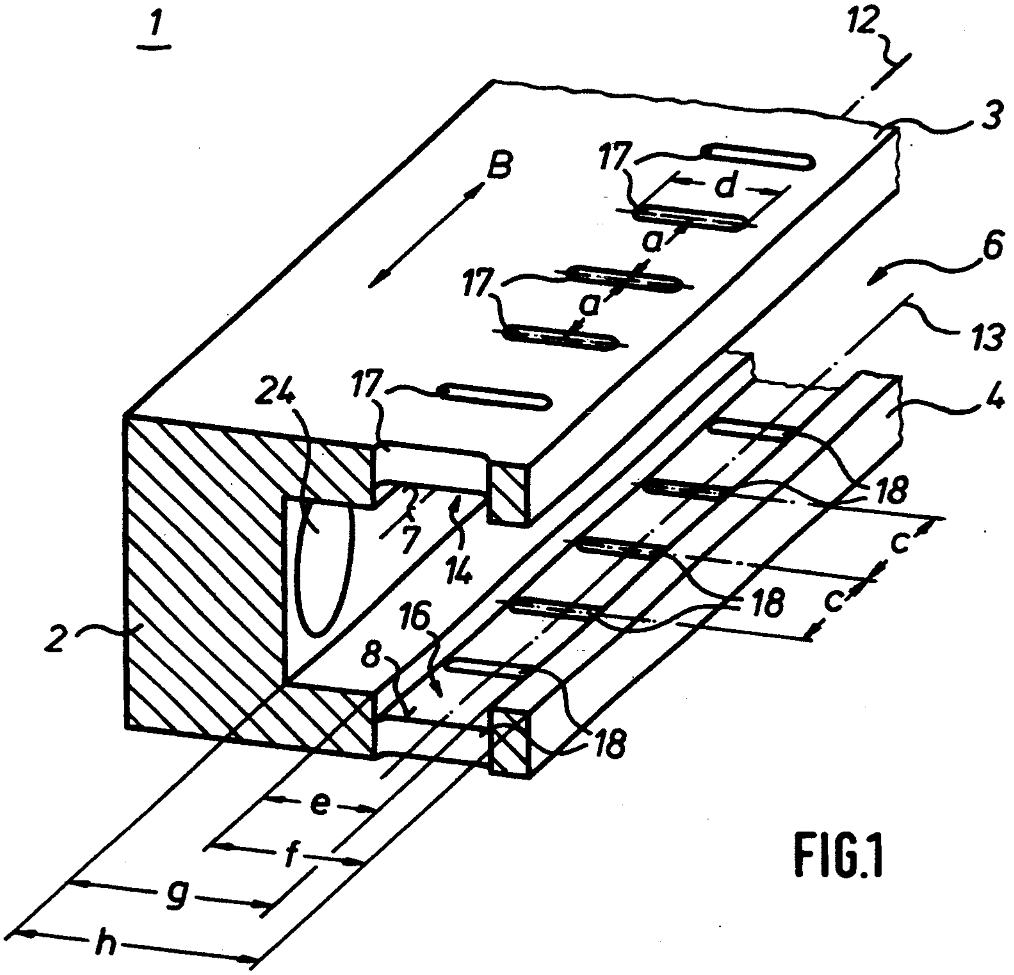
FIG. 1 is a perspective view of a first preferred embodiment of a profiled guide rail in accordance with the present invention.
Figure 2:
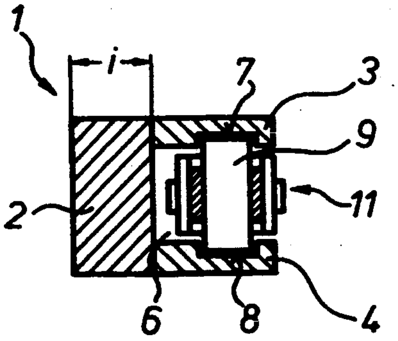
FIG. 2 is a cross-sectional view of the C-shaped profiled guide rail of FIG. 1 and showing a roller chain being guided.

Referring initially to FIG. 1, there may be seen generally at 1 a first preferred embodiment of a profiled guide rail in accordance with the present invention. As may be seen most clearly in FIG. 1 and as is also shown in FIG. 2, the profiled guide rail, generally at 1, is generally a straight element which is formed with a generally C-shaped cross-section. A base body 2, which has a generally rectangular cross-sectional shape, extends in the longitudinal direction of the profiled guide rail 1, and forms the back of the C-shaped guide rail. A pair of spaced legs 3 and 4 extend out from one side of the base body 2 in a generally cantilever fashion. As seen in FIGS. 1 and 2, the two legs 3 and 4 are generally parallel to each other, extend at generally right angles to the base body 2, and form the sides of the generally C-shaped profiled guide rail 1. These two legs 3 and 4 extend along in the longitudinal direction of the guide rail 1 and cooperate with the base body 1 to form the C-shaped profile which defines a central conduit 6. This conduit 6 is open at its longitudinal ends and is bounded on three sides by the base body 2 and the two legs 3 and 4.

Each of the guide rail legs 3 and 4 has an inwardly facing track 7 and 8, respectively, with these two tracks 7 and 8 facing each other, as seen in FIGS. 1 and 2. These tracks 7 and 8 are used to guide the rollers 9 of a roller chain 11, which is depicted in FIG. 2. It will be understood that the roller chain is used in a generally well known manner to lead a paper web through the web-fed rotary printing press in which the profiled guide rails of the present invention finds use. The roller chain 11 can be driven by generally well known drive stations which utilize, for example, drive motors with pinion gears. The roller chain 11 is movable in the profiled guide rail 1 in the direction indicated by the arrow B in FIG. 1.

The two tracks 7 and 8 of the profiled guide rail 1 have longitudinal axes 12 and 13, respectively, which extend in the direction of movement of the roller chain 11. Each track 7 and 8 is formed in its respective leg 3 and 4, respectively as the bottom of a groove 14 or 16, respectively. As may be seen in FIG. 1, these grooves 14 and 16 each have a width "e" which is slightly wider than the width of the rollers 9 of the roller chain 11 which is guided in the profiled guide rack 1 of the present invention.

As may be seen most clearly in FIG. 1, each of the legs 3 and 4 of the profiled guide rail 1 of the present invention has a plurality of transverse slits 17 and 18. In accordance with the first preferred embodiment, these transverse slits or openings 17 and 18 extend at generally right angles to the longitudinal axes 12 and 13 of the tracks 7 and 8. These slits 17 and 18 pass through the legs 3 and 4, have a length "d" generally the same as the width "e" of the grooves 14 and 16, and have a spacing "a" or "c" with respect to each other. As will be seen in FIG. 1, the slits 17 in leg 3 have a spacing "a" while the slits 17 in leg 4 have a spacing "c". These slits 17 and 18 can be embodied with rounded ends. They can be disposed opposite to each other in the legs 3 and 4. Alternatively, these slits 17 and 18 can be offset with respect to each other along their longitudinal arrangement in legs 3 and 4. The spacings "a" and "c" of the slits 17 and 18 in the two legs 3 and 4 can be equal or not equal so that $a=c$ or $a \neq c$. The slits 17 and 18 can, as set forth above, have a length "d" which equals to the width "e" of the grooves 14 and 16. Alternatively, the slits 17 and 18 can have lengths "d" which are equal to the dimensions "f", "g" or "h" as these are shown in FIG. 1. It will be understood that dimension "f" represents the width from the inner edge of the groove 14 or 16 to the outer edge of the leg 3 or 4; that the diminishing "g" represents the width from the outer edge of the groove 14 or 16 to the inner edge of the base body 2; and that the dimension "h" represents the width of the leg 3 or 4 from the inner edge of the base body 2 to the free end of the leg 3 or 4. Thus the slit length "d" can equal "e", "f", "g" or "h". As may be seen in FIG. 1, "h" > "g" or "f" > "e".

It is also possible, in accordance with the first preferred embodiment to provide only one of the two legs 3 or 4 with slits 17 or 18, respectively. It is also possible that the slits 17 and 18 may be disposed at an angle other than 90° with respect to the longitudinal axes 12 and 13 of the legs 3 and 4. While the slits 17 and 18 are depicted in FIG. 1 as being elongated, straight slits, it is also possible to provide these slits with various curved shapes, such as V-shapes, W-shapes, or sinusoidal shapes. In all instances, the slits 17 and 18 serve as escape paths through which ink and paper dust, which would otherwise accumulate in the tracks 7 and 8, may be forced by the action of the roller chain 11 passing along the profiled guide rail as it feeds a paper web through the web-fed rotary printing press.

Figure 4:
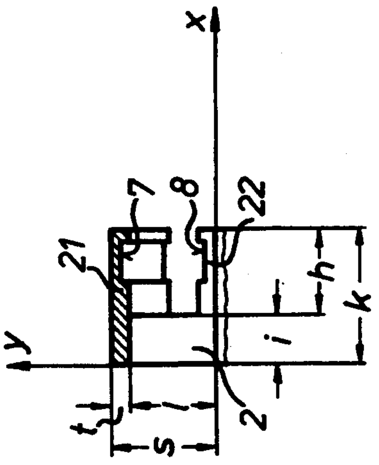
FIG. 4 is a cross-sectional view of the profiled guide rail of FIG. 3 and taken along line IV—IV of FIG. 3.
Figure 5:
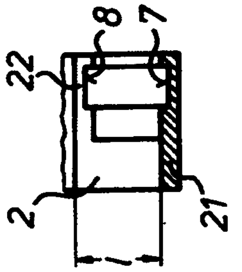
FIG. 5 is a view similar to FIG. 4 and taken along line V—V of FIG. 3.
Figure 3:
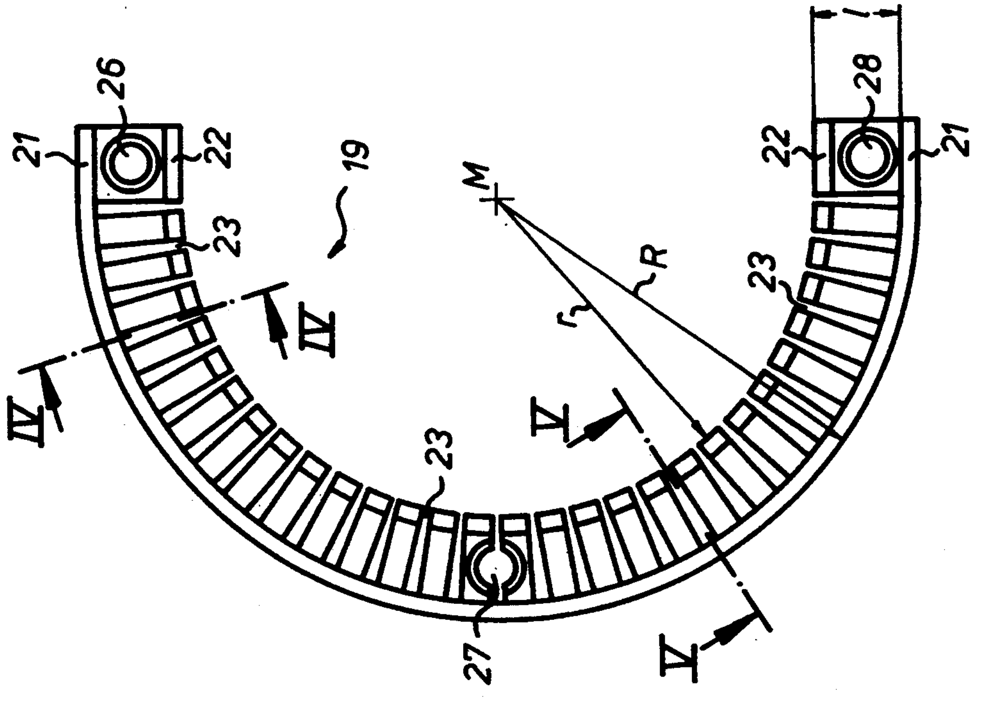
FIG. 3 is a front elevation view of a second preferred embodiment of a profiled guide rail in accordance with the present invention.

Referring now to FIGS. 3, 4 and 5, there may be seen a second preferred embodiment of a profiled guide rail, generally at 19, in accordance with the present invention. Whereas the first preferred embodiment 1 of the profiled guide rail, as depicted in FIGS. 1 and 2, is intended primarily for use as a straight profiled rail, the second preferred embodiment 19 of the profiled guide rail, as depicted in FIGS. 3–5, is intended for use as a curved profiled guide rail. In the configuration depicted in FIG. 3, the profiled guide rail 19 is shown having a wrap angle of generally 180°. This type of configuration would be most usable when the paper web guide path extends around a press cylinder or paper guide roller which is not specifically shown. The curved profiled guide rail 19 has, as seen in FIG. 3, a center M of a circle, an inner radius "r" and an outer radius "R". The profiled guide rail 19 still includes a base body 2 and two legs 21 and 22 which are generally similar in shape and function to their counterparts 2, 3 and 4, respectively as described in connection with the first preferred embodiment 1. However, as may be seen in FIGS. 3–5, the first or outer circumferential leg 21 has no slits. The second or inner circumferential leg 22 has a plurality of slits 23 each of which has a length "k". This slit length "k" is, as seen in FIG. 4, the sum of the width "h" of the leg 22 plus the width or thickness "i" of the base body 2 of the profiled guide rail 19. Thus "k"="h" +"i". As may be seen in FIG. 4 in which a right-angled coordinate system has been interposed on top of the cross-sectional view of the profiled guide rail 19 and in which the direction of the X-axis or the abscissa extends horizontally to the right, the slit 23 has a length "k" which, as discussed above, corresponds to the width "h" of the leg 22 itself plus the thickness "i" of the base body 2. The slit 23 also has a height which extends in the second, Y-axis or ordinate direction of the right angle coordinate system by an amount "l" with this amount "l" corresponding to a height "s" of the base body 2 less the thickness "t" of the first leg 21. This means that each slit 23 penetrates the second leg 22 and the base body 2 as far as the first leg 21. It would also be understood that the slit 23 could penetrate the first leg 21 and the base body 2 as far as the second leg 22.

In the curved profiled guide rail 19 shown in FIGS. 3–5, each of the slits 23 can be configured as straight slits, or as discussed in connection with the first preferred embodiment, these slits 23 may be V-shaped, W-shaped or sinusoidal. In accordance with the present invention, it is also possible to substitute through-bores in place of the slits 17, 18 or 23 since these slits or bores are also designated as openings 17, 18 or 23. These openings 17, 18 or 23 can deviate from the circular cross-section of a bore and can have arbitrary cross-sections.

The base body 2 of the straight profiled guide rail 1, as seen in FIG. 1 is provided with spaced through bores or apertures 24. In a similar manner, the base body 2 of the curved profiled guide rail 19 is, as may be seen in FIG. 2, provided with spaced through bores or apertures 26, 27, and 28. These apertures 24, 26, 27 and 28 are used to secure the profiled guide rails 1 and 19 to the side frames of a web-fed rotary printing press by placing suitable fastening screws through these apertures and into the side frames.

The curved profiled guide rail 19 depicted in FIG. 3 is a single segment which forms one half of a circle. It will be understood that a curved profiled guide rail section can consist of several segments 19 or of one segment 19 which can be disposed in an S-shape. The curved profiled guide rail 19 can have a wrap angle of greater or less than 180°. Further, a plurality of curved profiled guide rail segments 19 and straight profiled guide rail segments 1 can be cooperatively utilized to form a complete profiled guide rail path.

The profiled guide rails 1 and 19 in accordance with the present invention can be made out of metal or plastic. They can also be made of a reinforced fiber plastic or of a suitable composite material.

While preferred embodiments of a profiled guide rail in accordance with the present invention have been set forth fully and completely hereinabove, it will be apparent to one of skill in the art that a number of changes in, for example, the overall size of the guide rail, the type of roller chain used, the type of web-fed rotary printing press with which the profiled guide rail is used, and the like may be made without departing from the true spirit and scope of the present invention which is accordingly to be limited only by the following claims.

I claim:

1. A profiled guide rail usable to receive and guide a roller chain movable in said profiled guide rail for the feeding of paper in a web fed rotary printing press, said profiled guide rail comprising:
- a base body;
- first and second spaced legs extending at right angles from said base body, said first and second spaced legs and said base body defining a generally C-shaped conduit for a roller chain; and
- a plurality of openings in at least one of said first and second legs, said plurality of openings each penetrating through an entire width of said at least one of said first and second legs and extending at right angles from said base body and being spaced from each other in a running direction of a roller chain receivable in said profiled guide rail.

2. The profiled guide rail of claim 1 wherein each of said openings penetrates said base body as far as a point of intersection of an other of said first and second legs with said base body.

3. The profiled guide rail of claim 1 wherein said openings are straight lines.

4. The profiled guide rail of claim 1 wherein said openings are curved.

5. The profiled guide rail of claim 1 wherein said openings are through bores.

6. The profiled guide rail of claim 1 wherein said profiled guide rail has a curved shape with at least one curved section.

7. A profiled guide rail usable to receive and guide a roller chain movable in said profiled guide rail for the feeding of paper in a web fed rotary printing press, said profiled guide rail comprising:
- a base body;
- first and second spaced legs extending at right angles from said base body, said first and second spaced legs and said base body defining a generally C-shaped conduit for a roller chain, each of said first and second legs having a groove, said grooves defining a track having a width for receiving a roller chain; and
- a plurality of openings in at least one of said first and second legs, said plurality of openings penetrating through said at least one leg and spaced from each other in a running direction of a roller chain receivable in said profiled guide rail, each of said openings having said width of said track.

8. The profiled guide rail of claim 7 wherein said openings are disposed at right angles to a longitudinal axis of said groove.

9. The profiled guide rail of claim 7 wherein said openings are disposed obliquely to a longitudinal axis of said groove.

10. The profiled guide rail of claim 7 wherein said openings are straight lines.

11. The profiled guide rail of claim 7 wherein said openings are curved.

12. The profiled guide rail of claim 7 wherein said openings are through bores.

13. A profiled guide rail usable to receive and to guide a roller chain which is movable in said profiled guide rail to feed a paper web in a web fed rotary printing press, said profiled guide rail comprising:
- a generally rectangular base body;
- first and second spaced legs secured at inner ends to said base body and extending from said base body generally perpendicular to said base body and parallel to each other, said base body and said first and second spaced legs defining a generally C-shaped conduit for receiving a roller chain;

a groove formed on an inner surface of each of said first and second legs, said first and second grooves facing each other and forming guide tracks for a roller chain, each of said guide tracks having a width; and a plurality of openings in at least one of said first and second legs, each of said openings penetrating through said at least one leg, each of said openings having a length at least as great as said track width.

* * * * *